Figures 1, 2:
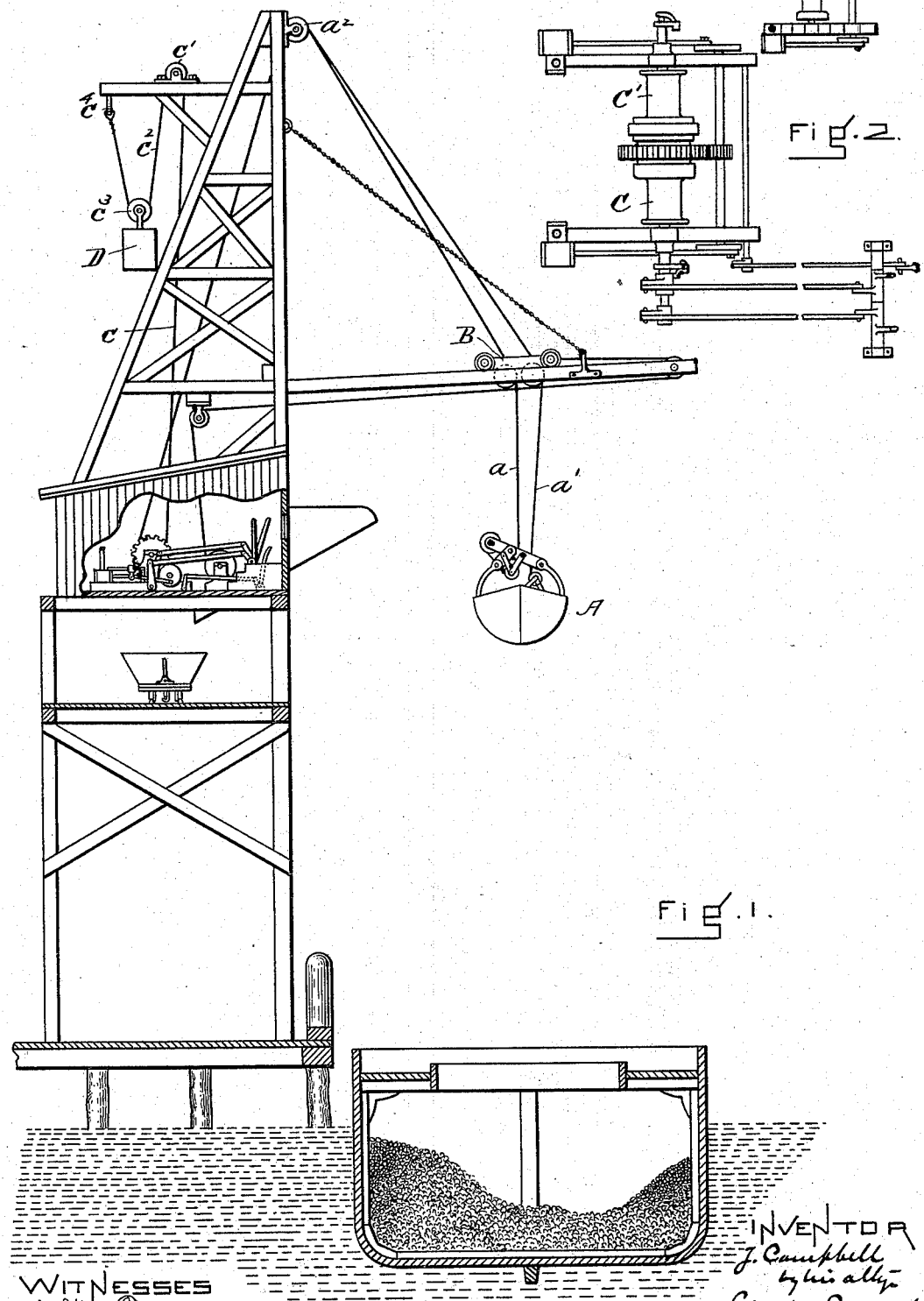

(No Model.)

J. CAMPBELL.
STEAM SHOVEL.

No. 573,204. Patented Dec. 15, 1896.

WITNESSES
J. M. Dolon.
Leo A. Walsh.

INVENTOR
J. Campbell
by his atty
Clarke & Raymond

UNITED STATES PATENT OFFICE.

JEREMIAH CAMPBELL, OF CHELSEA, MASSACHUSETTS.

STEAM-SHOVEL.

SPECIFICATION forming part of Letters Patent No. 573,204, dated December 15, 1896.

Application filed May 29, 1896. Serial No. 593,608. (No model.)

*To all whom it may concern:*

Be it known that I, JEREMIAH CAMPBELL, a citizen of the United States, residing at Chelsea, in the county of Suffolk and State of Massachusetts, have invented a new and useful Improvement in Steam-Shovels, of which the following is a full, clear, and exact description, reference being had to the accompanying drawings, forming a part of this specification, in explaining its nature.

The object of the invention is to provide means whereby less power may be used in operating steam-shovels than has heretofore been required. It is well known that these shovels are heavy and are used in lifting heavy loads, and that they are very rapidly moved or operated, and that they require very considerable power to run them, as the entire weight of the shovel and shovel and load are borne by the winding drum or spool operated by the engine. By my invention I take a large portion of the load from the drum or spool by counterbalancing the shovel by means of a weight that shall very nearly equal the weight of the shovel itself, thereby making the weight take the place of a portion of the power, reducing by so much the weight of the shovel or shovel and its load.

I have represented this invention as carried into effect by extending the rope known as the "hoisting-rope" from its operating drum or spool to and about pulleys, whereby it is made effective in receiving the weight in question, and in the drawings—

Figure 1 is a view principally in side elevation of a steam-shovel and its operating devices so improved. Fig. 2 is a view in plan of a portion of the said devices, to which reference will hereinafter be made.

A represents the steam-shovel. It is of any desired type and is shown as operated by two ropes, namely, the hoisting-rope $a$ and the opening and closing rope $a'$. These ropes pass over rolls carried by the trolley B, and over the sheaves $a^2$ to the drums C C' of the engine, the drum C operating the hoisting-rope and the drum C' the opening and closing rope. These drums are attached to their operative shaft by a friction-clutch in the usual way, whereby they are thrown into and out of engagement with the driving-shaft at the will of the engineer or operator, and they also have connected with them brakes which are set thereon by the engineer or operator at will for the purpose of stopping their revolutions and for holding them stationary as against any stress of the shovel thereon.

It will be understood that in the ordinary operation of the shovel in, for instance, discharging coal from a barge two engines are required and two engineers. One controls the engine which operates or winds and unwinds the hoisting-rope and the opening and closing rope. He governs the vertical position of the shovel. The other engineer, operating through the second engine, governs or controls the position of the trolley, and through it the horizontal position of the shovel.

The present invention has to do with the first engine or with the devices which control the lifting and lowering of the shovel and its opening and closing.

To counterbalance the shovel, the hoisting-rope instead of being stopped at the drum C, as is usual, is wound two or three times about it and is then extended therefrom upward (see Fig. 1) about the sheave or pulley $c'$, then downward, as at $c^2$, under the sheave or pulley $c^3$, attached to the weight D, and then upward to a stationary point of attachment $c^4$.

The weight D preferably is enough to very nearly counterbalance the weight of the shovel A. The shovel must be enough heavier than the weight to readily drop after it has been discharged or unloaded and lift the weight D. The weight, it will be observed, has but half the travel of the shovel. By this structure it becomes possible to use the weight in connection with the shovel in a number of ways; that is, the drum C may be used either with or without power. The additional power required for operating the shovel is obtained through the drum C'. The drum C is then operated by means of the friction or brake alone, or, if desired, it may be operated by power also. Whichever way it is actuated the weight serves to help in balancing the shovel to relieve the engine from some of the work heretofore required of it and in so far effects a saving in the cost of the operation of the engine.

I would not be understood as limiting the manner of counterbalancing the shovel to the specific way herein described.

It will be understood that in the operation of this device the shovel is lowered and raised, closed and opened, and transferred by the trolley during said vertical movements in substantially the same way that said shovels are commonly used, but that the weight relieves the engine from the work otherwise required of it in so far as it lessens the weight of the shovel or the shovel and its load, and this is accomplished without in any way interfering with the usual operations and movements of the shovel.

Having thus fully described my invention, I claim and desire to secure by Letters Patent of the United States—

1. The combination of the steam-shovel A, the opening and closing drum C′, the hoisting-drum C, the opening and closing rope $a'$ extending to the drum C′, the hoisting-rope $a$ extending about the drum C over the pulley $c'$ to the point $c^4$, and the weight D carried upon said rope $c$ between said pulley $c'$ and the said point of attachment, as and for the purposes described.

2. The combination of a steam-shovel adapted to be raised and lowered, a trolley for moving it horizontally, and a balancing-weight D connected with the shovel to counterbalance it in part.

JEREMIAH CAMPBELL.

Witnesses:
F. F. RAYMOND, 2d,
J. M. DOLAN.